United States Patent
Sandstrom

(10) Patent No.: US 9,290,679 B2
(45) Date of Patent: Mar. 22, 2016

(54) WATER BASED RUBBER CEMENT AND TIRE WITH FABRICATED TREAD

(71) Applicant: The Goodyear Tire & Rubber Company, Akron, OH (US)

(72) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 141 days.

(21) Appl. No.: 13/744,549

(22) Filed: Jan. 18, 2013

(65) Prior Publication Data

US 2014/0202607 A1     Jul. 24, 2014

(51) Int. Cl.
*B60C 1/00* (2006.01)
*B60C 11/00* (2006.01)
*C09J 107/02* (2006.01)

(52) U.S. Cl.
CPC ............. *C09J 107/02* (2013.01); *B60C 1/0016* (2013.04); *B60C 11/0008* (2013.04); *Y10T 152/10495* (2015.01)

(58) Field of Classification Search
CPC ........ B60C 11/00; B60C 1/00; B60C 1/0016; B60C 11/008
See application file for complete search history.

(56) References Cited

U.S. PATENT DOCUMENTS

| | | | |
|---|---|---|---|
| 4,474,908 A | 10/1984 | Wagner | 523/213 |
| 5,605,951 A * | 2/1997 | Sandstrom et al. | 524/494 |
| 5,780,538 A | 7/1998 | Cohen et al. | 524/494 |
| 6,127,468 A | 10/2000 | Cruse et al. | 524/225 |
| 6,573,324 B1 * | 6/2003 | Cohen et al. | 524/492 |
| 7,214,731 B2 * | 5/2007 | Zanzig | B60C 1/0016 152/151 |
| 8,143,338 B1 | 3/2012 | Pompei et al. | 524/474 |

FOREIGN PATENT DOCUMENTS

| | | | |
|---|---|---|---|
| JP | 6-896 | * | 1/1994 |
| JP | 2011-241363 | * | 12/2011 |

OTHER PUBLICATIONS

Machine translation of JP 2011-241363, 2011.*

* cited by examiner

*Primary Examiner* — Justin Fischer
(74) *Attorney, Agent, or Firm* — Henry C. Young, Jr.

(57) ABSTRACT

The invention relates to a water based rubber cement and tire with fabricated tread where the tire tread is fabricated by joining ends of an uncured rubber strip containing a high content of hydrophobated precipitated silica content with a water based cement containing a diene-based elastomer and a component reactive with said diene based elastomer and with residual hydroxyl groups on said hydrophobated precipitated silica contained in said uncured rubber strip.

8 Claims, No Drawings

WATER BASED RUBBER CEMENT AND TIRE WITH FABRICATED TREAD

FIELD OF THE INVENTION

This invention relates to a water based rubber cement and tire with fabricated tread where the tire tread is fabricated by joining ends of an uncured rubber strip containing a high content of hydrophobated precipitated silica content with a water based cement containing a diene-based elastomer and a component reactive with said diene based elastomer and with residual hydroxyl groups on said hydrophobated precipitated silica contained in said uncured rubber strip.

BACKGROUND OF THE INVENTION

Rubber tires are often prepared in a manufacturing process by first building a tire carcass and then building a tire tread over the carcass. The tire tread is conventionally applied to the tire carcass as an uncured rubber strip, which may be contoured, where the uncured rubber strip is wound around the carcass with the ends of the uncured rubber strip meeting to form a splice. The ends of the uncured rubber tread strip for a new tire are usually skived, or cut, at an angle to permit the ends of the uncured rubber strip to overlay (overlap) each other to some degree, instead of a straight cut in a form of a butt splice, to form a splice comprised of joining the ends of the uncured rubber tread strip. Such procedural tire tread fabrication utilizing a splice to join the ends of an uncured tread rubber strip is well known to those having skill in such art.

For such practice, it is desired that the ends of the uncured rubber tread strip necessarily have a degree of tackiness, sometimes referred to as building tack, so that the tread splice holds together after its construction and is suitable for subsequent tire molding and curing. However, for such splice, the ends of the uncured rubber tread strip sometimes do not have sufficient desirable natural building tack for such purpose so that a rubber cement is sometimes applied to the surface of at least one end of the rubber strip to aid in promoting building tack. For example, see U.S. Pat. No. 8,143,338.

Providing such building tack for the ends of such uncured rubber strip is considered to be significantly more challenging where the rubber composition of the strip contains a high content of precipitated silica, namely a hydrophobated precipitated silica, where the content of such silica in the rubber composition can significantly exceed the content of the rubber (elastomer) itself. Such high content of hydrophobated silica is considered to reduce the building tack of the uncured rubber composition.

In practice, precipitated silica (an amorphous synthetic silica) is hydrophilic in nature and thereby challenging to efficiently blend with and disperse within diene-based elastomers unless it is made more hydrophobic in nature as is understood to be well known to those having skill in such art. Such hydrophilic precipitated silica may, for example, be hydrophobated in situ within the rubber composition or may be pre-hydrophobated prior to its addition to a rubber composition. For example, see U.S. Pat. Nos. 4,474,908, 5,780, 538, 6,127,468 and 6,573,324

The precipitated silica may be hydrophobated for example, with one or more hydrophobation promoting compounds which are reactive with hydroxyl groups (e.g. silanol groups) contained on the precipitated silica which may be comprised of, for example one or more of alkoxysilane, alkylsilane, halogenated alkylsilane, and silica coupling agents such as, for example, bis(3-trialkoxysilylalkyl)polysulfide containing an average in a range from about 2 to about 4 connecting sulfur atoms in their polysulfidic bridges (e.g. comprised of bis(3-tri ethoxysilylpropyl)polysulfide, or an organoalkoxymercaptosilane.

As indicated, it is understood that such hydrophobation promoting compounds rely, at least in part, upon reaction of its silane or siloxane moiety with hydroxyl groups (e.g. silanol groups) on the precipitated silica. For such reaction, it is understood that not all of the hydroxyl groups of the precipitated silica become chemically interacted with such compounds and that therefore a portion of the hydroxyl groups on the precipitated silica remain as available hydroxyl groups for further chemical reaction(s).

Historically, as previously indicated, a rubber cement coating is often applied to the face, or end surface, of at least one of the opposing ends of an uncured tire tread rubber strip to promote building tack and the ends joined to form a splice thereof with the resulting promoted building tack between the ends of the tread strips relied upon to hold the splice together during the tire building process. Organic solvent based and water based cements have been used for such purpose, although water based cements are normally expected to take an extended period of time to dry, normally for the water to evaporate, prior to joining the ends of the uncured rubber strips.

For this invention, it is desired to undertake providing building tack to the ends of such uncured rubber tread strip which contains a high content of particulate hydrophobated precipitated silica, namely an uncured tread rubber strip comprised of a rubber composition having a hydrophobated precipitated silica content at least about 70 weight percent, alternately at least about 105 weight percent and alternately at least about 175 weight percent based on its rubber content.

On such basis, then, it is desired for the building tack promoting cement to interact with the hydrophobated silica as well as the elastomer of the rubber composition of the uncured rubber strip, particularly with the ends of the uncured rubber strip joined together to form a splice.

For this invention, then, as indicated, it is desired to undertake providing building tack to ends of an uncured rubber tread strip with a water based composition to promote building tack for the splice and thereby forming a splice, namely a spliced uncured rubber tread strip, with a water based composition where the rubber composition of the uncured tread strip contains a high content of particulate hydrophobated precipitated silica, namely where such hydrophobated silica significantly exceeds the rubber content of the rubber composition.

In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art.

SUMMARY AND PRACTICE OF THE INVENTION

In accordance with this invention, a water based cement (for promoting tack between ends of an uncured rubber strip with a high content of hydrophobated precipitated silica) which is exclusive of alkoxysilane and alkylsilane containing compounds and where said water based adhesive is comprised of, based on parts by weight per 100 parts by weight rubber (phr):

(A) at least one diene-based elastomer latex (e.g. aqueous elastomer emulsion),
(B) silica coupling agent compound comprised of at least one of:
  (1) carboxymaleimidophenhyl ester,
  (2) disodium salt of 2,2'-dithiosalicylic acid,
  (3) bis-succimide polysulfide,
  (4) 2-benzothiozyl-3-(propane-1,2-diol),
  (5) o-salicylalicylic acid,
  (6) pyrazine amide,
  (7) 3,3'-tetrathiodipopanol,
  (8) hydroxyethyl-phenoxyacetic acid
  (9) 3,3'-tetrathiodiproopionamide,
  (10) poly-(2-propanol-1,3-polysulfide),
  (11) 3,3'-tetrathiodipropionitrile,
  (12) nicotinamide,
  (13) zinc and sodium salts of salicylic acid,
  (14) diamompdorpsomate salt, and
  (15) bisaniline PD bismaleimide
(C) optionally sulfur and at least one sulfur cure accelerator.

In one embodiment, said diene-based elastomer latex is natural rubber (cis 1,4-polyisoprene rubber) latex.

In one embodiment, said water based cement contains from about 2 to about 25, alternately from about 5 to about 15 phr of resin comprised of at least one of hydrocarbon resins, phenol/acetylene resins and rosin acid resins. In an additional embodiment said water based adhesive contains from about 2 to about 70 alternately from about 5 to about 50 phr of rubber reinforcing carbon black.

In a further embodiment, said water based cement optionally contains at least one of zinc oxide and fatty acid comprised of at least one of stearic, palmitic and oleic acid.

Representative of the aforesaid hydrocarbon resins include coumarone-indene resins, petroleum derived resins, terpene polymers and mixtures thereof.

Coumarone-indene resins are commercially available in many forms with melting points ranging from 10° C. to 160° C. (as measured by the ball-and-ring method). Preferably, the melting point ranges from 30° C. to 100° C. Coumarone-indene resins are well known.

Hydrocarbon resins are, in general, petroleum resins commercially available with softening points ranging from 10° C. to 120° C. Desirably, the softening point ranges from 30° C. to 100° C. Suitable petroleum resins include both aromatic and non-aromatic resins. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include dicyclopentadiene, cyclopentadiene, their dimers and diolefins such as isoprene and piperylene.

Terpene polymers are produced by polymerizing beta pinene which may be contained in mineral spirits. The resin may be provided in a variety of melting points ranging, for example, from about 10° C. to 135° C. The terpene polymers may also, for example, be a copolymer of beta pinene and diclopentadiene.

Phenol/acetylene resins may be used. Phenol/acetylene resins may be derived, for example, by the addition of acetylene to an alkyl phenol such as for example butyl phenol, in the presence of, for example, zinc naphthlate.

Historically, rosin acid resin, which might sometimes be referred to as "rosin", is a solid resinous material (at 23° C.) which contains a high concentration of carboxylic acid groups which occurs naturally in pine trees. There are three major exemplary sources of the rosin acid which might be referred to as gum, wood and tall oil rosin Gum rosin acid, which might be referred to as "rosin", is typically from the oleoresin extrudate of the living pine tree.

Wood rosin acid, which might be referred to as "wood rosin" or "rosin", is typically from the oleoresin contained in the aged pine tree stumps.

Tall oil rosin acid, which might be referred to as "rosin", is typically from the waste liquor recovered as a by-product in the paper production industry. For example, wood rosin may be obtained from aged pine tree stumps. In such practice, a pine tree stump may be allowed to remain in the ground for a number of years so that its bark and sapwood may decay and slough off to leave the heartwood rich in rosin acid, which might sometimes be referred to as "wood rosin". Historically, rosin acids derived from both oleoresin and aged pine tree stump wood are typically composed of, for example, about 90 percent rosin acids and, for example, about 10 percent nonacidic components.

Representative of various wood rosin acids are, for example, rosin acids referred to as abietic, levopimaric, neoabietic, palustric, dehydroabietic, dihydroabietic, tetrahydroabietic, pimaric, isopimaric, elliotinoic and sandaracopimaric.

The mixing of the water based adhesive composition can be accomplished by methods known to those having skill in such art.

In further accordance with the invention a pneumatic tire is provided which comprises an assembly of uncured rubber components including an outer circumferential uncured tread rubber strip with opposing ends of said tread rubber strip joined to form a splice which includes said dried cement composition (the cement having been applied and dried to remove the water) between said opposing ends of said rubber strip (to promote building tack for the opposing ends of said uncured tread rubber strip), wherein the rubber composition of said uncured tread rubber strip is comprised of, based on parts by weight per 100 parts by weight of rubber (phr):
(A) 100 phr of at least one sulfur curable diene-based elastomer, and
(B) about 70 to about 200, alternately from about 105 to about 175, phr of hydrophobated precipitated silica;

wherein said hydrophobated precipitated silica is comprised of amorphous synthetic precipitated silica (precipitated silica) hydrophobated with:
 (1) at least one silica coupling agent comprised of:
  (a) bis(3-trialkoxysilylalkyl)polysulfide containing an average from about 2 to about 4 connecting sulfur atoms in its polysulfidic bridge (e.g. comprised of bis(3-triethoxysilylpropyl)polysulfide, or
  (b) alkoxyorganomercaptosilane, and optionally
 (2) at least one alkoxysilane, and
 (3) combination of said silica coupling agent and alkoxysilane.

Therefore, in one embodiment, where the rubber composition of the tread rubber strip contains from about 105 to about 175 phr of hydrophobated precipitated silica, the content of hydrophobated precipitated silica is greater than the content of diene-based elastomer in the rubber composition.

It is appreciated that said precipitated silica may be hydrophobated prior to its addition to the rubber composition or hydrophobated in situ within the rubber composition.

The assembly of uncured rubber components, including the spliced ends of said circumferential uncured tread rubber strip with the dried cement therebetween, is sulfur cured to form the pneumatic tire.

In further accordance with this invention, for the tire preparation, a method of joining opposing ends of the uncured tread rubber strip, as a component of an assembly of uncured rubber components of a tire, comprises applying said cement to at least one surface of the opposing ends of the uncured tire tread rubber strip and drying the cement (to remove the water) to promote building tack for tread strip ends and the uncured tread rubber strip ends then joined (with the dried cement therebetween) together to form a splice, following which the assembly of uncured rubber components is cured to form the tire.

In one embodiment, the method comprises heating the water based cement coating on an end of the uncured rubber strip, prior to joining the strip ends form the splice, to a temperature, for example in a range of from about 80° C. to about 150° C., to promote a more rapid drying of the cement by evaporation of the water. Such heating may be provided, for example, by at least one of infrared and hot air treatment directed to the coating on the associated end of the uncured rubber strip and conducted in a short enough time span to prevent premature curing of the rubber tread spliced surfaces.

A significant aspect of the invention is for water based cement, upon drying the cement to remove water, to promote building tack for joining the opposing ends of the uncured tread rubber strip having a high content of hydrophobated precipitated silica which greatly exceeds the content of rubber in the tread strip rubber composition in a manner for the cement (which contains a silica coupling agent without silica itself) to interact with the available remaining hydroxyl groups of hydrophobated silica contained in the uncured tread rubber strip rubber composition as well as the elastomer of the uncured tread rubber strip, in order to promote building tack between opposing ends of the uncured rubber strip for joining them together to form a splice.

The invention is also directed to a tire made by the foregoing method.

In one aspect, said diene based elastomer(s) for the tread rubber strip, is comprised of at least one polymer of at least one of isoprene and 1,3-butadiene and styrene with at least one of isoprene and 1,3-butadiene.

Representative of such elastomers are, for example, cis 1,4-polyisoprene, cis 1,4-polybutadiene, styrene/butadiene and styrene/isoprene/butadiene terpolymers.

In one embodiment, an elastomer (e.g. a styrene/butadiene rubber) may be a tin or silicon coupled elastomer.

In one embodiment, an elastomer may be a functionalized elastomer (e.g. a styrene/butadiene rubber) containing, for example, at least one functional group comprised of at least one of amine, siloxy, carboxyl and hydroxyl groups, particularly functional groups. Such functional groups may be reactive with, for example, hydroxyl groups on a precipitated silica, particularly on said hydrophobated precipitated silica.

In one embodiment, an elastomer may be a tin or silicon coupled elastomer.

In one embodiment, an elastomer may be a tin or silicon coupled elastomer (e.g. a styrene/butadiene rubber) containing at least one functional group comprised of, for example, amine, siloxy, carboxyl and hydroxyl groups. Such functional groups may be reactive with hydroxyl groups of a precipitated silica, particularly said hydrophobated precipitated silica.

The commonly employed precipitated silica are, for example, silicas by the acidification of a soluble silicate, e.g., sodium silicate.

Such conventional precipitated silicas might be characterized, for example, by having a BET surface area, as measured using nitrogen gas. In one embodiment, the BET surface area may be in the range of about 40 to about 600 square meters per gram. In another embodiment, the BET surface area may be, for example, in a range of about 80 to about 300 square meters per gram. The BET method of measuring surface area is well known by those having skill such art.

Various commercially available silicas may be used, such as, and without limitation, silicas commercially available from PPG Industries under the Hi-Sil trademark with designations 210, 243, etc.; silicas available from Rhodia, with, for example, designations of Z1165MP and Z165GR and silicas available from Evonik with, for example, designations VN2 and VN3, etc.

Commonly employed carbon blacks can be used in the cement composition in an amount ranging from 30 to 70 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

As known to those skilled in the art, depending on the intended use of the sulfur vulcanizable rubber compositions, the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount of, for example, ranging from 1 to 8 phr. Typical amounts of tackifier resins, comprise, for example, about 10 to about 20 phr. Typical amounts of antioxidants comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise, for example, about 1 to 5 phr. Typical amounts of fatty acids, which can include at least one of stearic, palmitic and oleic acids, and their mixtures, and comprise, for example, about 1 to about 5 phr. Typical amounts of zinc oxide comprise, for example, about 1 to about 5 phr.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 5 phr. In another embodiment, combinations of a primary and a secondary accelerator might be used with the secondary accelerator being used in smaller amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention such as for example, various amines, disulfides, guanidines, thioureas, thiazoles, thiurams, sulfenamides, dithiocarbamates and xanthates.

The water based adhesive composition may be applied to the surface of the ends of the uncured tread rubber strip using any of the various application methods as are known in the art, including but not limited to spraying, brushing, dipping, and wiping.

Any pneumatic rubber tire may utilize the water based cement composition of the present invention; such a tire may be a race tire, passenger tire, aircraft tire, agricultural, earthmover, off-the-road, truck tire, and the like. The tire may also be a radial or bias.

While in accordance with the patent statutes the best mode and preferred embodiment has been set forth, the scope of the invention is not limited thereto, but rather by the scope of the attached claims.

What is claimed is:

1. A pneumatic tire which comprises an assembly of uncured rubber components including an outer circumferential uncured tread rubber strip with opposing ends of said tread rubber strip joined to form a splice which includes a cement between said tread strip ends comprised of a dried aqueous cement composition between said opposing ends of said rubber strip, for which the cement composition is exclusive of silica, and alkoxysilane and alkylsilane containing compounds, and contains at least one silica coupling agent compound,
    wherein the rubber composition of said uncured tread rubber strip is comprised of, based on parts by weight per 100 parts by weight of rubber (phr):
    (A) 100 phr of at least one sulfur curable diene-based elastomer comprised of at least one polymer of at least one of isoprene and 1,3-butadiene and of styrene with at least one of isoprene and 1,3-butadiene;
    (B) about 70 to about 200 phr of hydrophobated precipitated silica;
    wherein said hydrophobated precipitated silica is comprised of precipitated silica hydrophobated with at least one silica coupling agent comprised of bis(3-triethoxysilylpropyl)polysulfide containing an average from about 2 to about 4 connecting sulfur atoms in its polysulfidic bridge or alkoxyorganomercaptosilane,
    wherein said aqueous cement composition contains silica coupling agent compound consisting of at least one of:
    (1) carboxymaleimidophenhyl ester,
    (2) disodium salt of 2,2'-dithiosalicylic acid,
    (3) bis-succimide polysulfide,
    (4) 2-benzothiozyl-3-(propane-1,2-diol),
    (5) o-salicylalicylic acid,
    (6) pyrazine amide,
    (7) 3,3'-tetrathiodipopanol,
    (8) hydroxyethyl-phenoxyacetic acid
    (9) 3,3'-tetrathiodiproopionamide,
    (10) poly-(2-propanol-1,3-polysulfide),
    (11) 3,3'-tetrathiodipropionitrile,
    (12) nicotinamide,
    (13) zinc and sodium salts of salicylic acid,
    (14) diamompdorpsomate salt, and
    (15) bisaniline PD bismaleimide
    wherein said cement contains from about 2 to about 70 phr of rubber reinforcing carbon black, and
    wherein said cement contains at least one of zinc oxide and fatty acid comprised of at least one of stearic, palmitic and oleic acid.

2. The cement of claim 1 which additionally contains sulfur and at least one sulfur cure accelerator.

3. The pneumatic tire of claim 1 wherein at least one of said elastomers of said tread strip tire component is a functionalized elastomer containing at least one functional group comprised of at least one of amine, siloxy, carboxyl and hydroxyl groups reactive with hydroxyl groups on said hydrophobated precipitated silica.

4. The pneumatic tire of claim 1 wherein at least one of said elastomers of said tread strip tire component is a tin or silicon coupled elastomer.

5. The pneumatic tire of claim 1 wherein at least one of said elastomers of said tread strip tire component is a tin or silicon coupled elastomer which is functionalized at least one functional group comprised of at least one of amine, siloxy, carboxyl and hydroxyl groups reactive with hydroxyl groups on said hydrophobated precipitated silica.

6. The tire of claim 1 where the assembly of uncured rubber components is cured to form a pneumatic tire.

7. The tire of claim 1 wherein said hydrophobated silica is hydrophobated with a bis(3-ethoxysilylpropyl polysulfide.

8. The tire of claim 1 wherein said hydrophobated silica is hydrophobated with an alkoxyorganomercaptosilane.

* * * * *